US012569771B2

(12) United States Patent
Khalfan

(10) Patent No.: US 12,569,771 B2
(45) Date of Patent: Mar. 10, 2026

(54) SYSTEMS AND METHODS TO FACILITATE GAME UNIT MANAGEMENT WITH A SMART CONTRACT RESPONSIVE TO BATTLES INVOLVING THE GAME UNITS

(71) Applicant: Disney Enterprises, Inc., Burbank, CA (US)

(72) Inventor: Alif Khalfan, Redwood City, CA (US)

(73) Assignee: Disney Enterprises, Inc., Burbank, CA (US)

(*) Notice: Subject to any disclaimer, the term of this patent is extended or adjusted under 35 U.S.C. 154(b) by 351 days.

(21) Appl. No.: 17/973,102

(22) Filed: Oct. 25, 2022

(65) Prior Publication Data

US 2023/0127351 A1 Apr. 27, 2023

Related U.S. Application Data

(60) Provisional application No. 63/272,321, filed on Oct. 27, 2021.

(51) Int. Cl.
*A63F 13/79* (2014.01)
(52) U.S. Cl.
CPC ..................................... *A63F 13/79* (2014.09)
(58) Field of Classification Search
None
See application file for complete search history.

(56) References Cited

U.S. PATENT DOCUMENTS

| | | | | |
|---|---|---|---|---|
| 11,247,127 B1* | 2/2022 | Linden | .................... | A63F 13/30 |
| 2010/0229106 A1* | 9/2010 | Lee | ........................ | H04L 67/131 |
| | | | | 715/757 |
| 2021/0086079 A1* | 3/2021 | Asano | ..................... | A63F 13/35 |
| 2021/0387093 A1* | 12/2021 | Linden | ..................... | A63F 13/60 |

(Continued)

FOREIGN PATENT DOCUMENTS

| | | |
|---|---|---|
| CN | 114036162 A | 2/2022 |
| CN | 114307164 A | 4/2022 |

(Continued)

OTHER PUBLICATIONS

Flavio Guerra, Axie Infinity Guide, https://www.docdroid.net/QVVwWkZ/axie-infinity-guide-flvaxs-eng-v10-pdf#page=2; Jun. 2021; (118 pages).

(Continued)

*Primary Examiner* — Jason T Yen
(74) *Attorney, Agent, or Firm* — Esplin & Associates, PC

(57) ABSTRACT

Systems and methods to facilitate game unit management with a smart contract responsive to battles involving the game units are disclosed. Exemplary implementations may: execute an instance of a game space that enables a battle involving game units that correspond to digital assets stored in player wallets associated with players in the battle; effectuate transfer of at least one digital asset to be in the battle from player wallets to a contract wallet administered by a smart contract; record battle information characterizing the battle; determine, based on battle information, a winning player and a losing player in the battle; transmit the battle information to the smart contract to effectuate, based on battle information, a transfer of a first digital asset from the contract wallet to a first player wallet associated with the winning player.

19 Claims, 5 Drawing Sheets

(56) References Cited

U.S. PATENT DOCUMENTS

| | | | |
|---|---|---|---|
| 2022/0084013 A1* | 3/2022 | Kulkarni | G06Q 20/3825 |
| 2022/0118365 A1* | 4/2022 | Thacker | A63F 13/71 |
| 2023/0079127 A1* | 3/2023 | Benedetto | A63F 13/69 |

FOREIGN PATENT DOCUMENTS

| | | |
|---|---|---|
| CN | 114377400 A | 4/2022 |
| CN | 114581229 A | 6/2022 |
| JP | 2021152815 A | 9/2021 |

OTHER PUBLICATIONS

EVO Surfers, https://docs.evosurfers.com/overview/introduction; Jul. 5, 2022 (18 pages).
NBA Properties, Inc .; The Association NFT, Dynamic NFTs for each player in the 2022 NBA Playoffs; https://theassociationnft. com/, 2022 (10 pages).
Alexandre Dewez; Overlooked; vhttps://alexandre.substack.com/p/-sorare-deep-dive-building-the-next; Nov. 8, 2021 (27 pages).

* cited by examiner

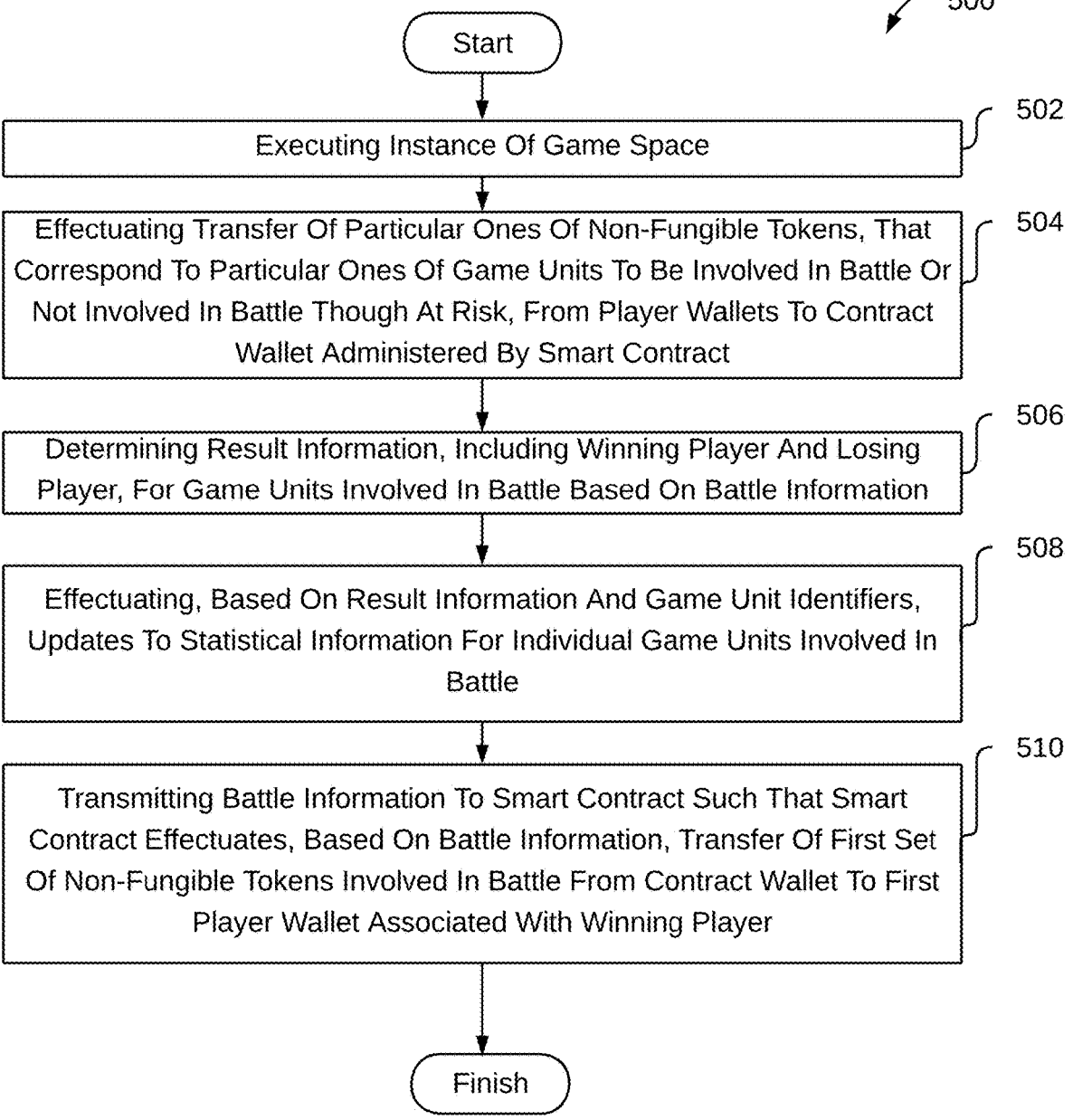

500

Start

502

Executing Instance Of Game Space

504

Effectuating Transfer Of Particular Ones Of Non-Fungible Tokens, That Correspond To Particular Ones Of Game Units To Be Involved In Battle Or Not Involved In Battle Though At Risk, From Player Wallets To Contract Wallet Administered By Smart Contract

506

Determining Result Information, Including Winning Player And Losing Player, For Game Units Involved In Battle Based On Battle Information

508

Effectuating, Based On Result Information And Game Unit Identifiers, Updates To Statistical Information For Individual Game Units Involved In Battle

510

Transmitting Battle Information To Smart Contract Such That Smart Contract Effectuates, Based On Battle Information, Transfer Of First Set Of Non-Fungible Tokens Involved In Battle From Contract Wallet To First Player Wallet Associated With Winning Player Finish

SYSTEMS AND METHODS TO FACILITATE GAME UNIT MANAGEMENT WITH A SMART CONTRACT RESPONSIVE TO BATTLES INVOLVING THE GAME UNITS

CROSS-REFERENCE TO RELATED APPLICATIONS

This application claims priority benefit of the U.S. Provisional Patent Application No. 63/272,321 titled, "SYSTEMS AND METHODS TO FACILITATE GAME UNIT MANAGEMENT WITH A SMART CONTRACT RESPONSIVE TO BATTLES INVOLVING THE GAME UNITS," filed on Oct. 27, 2021. The subject matter of this related application is hereby incorporated herein by reference.

FIELD OF THE DISCLOSURE

The present disclosure relates to systems and methods to facilitate game unit management with a smart contract that manages statistical information and ownership of game units responsive to battles involving the game units.

BACKGROUND

Individuals may collect cards, in the real-world and/or virtually, that are associated with a particular character or other entity and play the cards in games against other individuals. Based on these games, statistical information for the individual entities may be updated. Digital assets tracked on a decentralized ledger, such as non-fungible tokens, may be correlated with real-world or virtual cards that individuals may collect and/or play.

SUMMARY

One aspect of the present disclosure relates to a system configured to facilitate game unit management with a smart contract that manages statistical information and ownership of game units responsive to games involving the game units. A game space that enables player interactions, such as a battle involving game units (e.g., virtual playing cards), may be presented. The game units may correspond to, for example, non-fungible tokens stored in player wallets of the players in the battle. The non-fungible tokens and rights thereof (e.g., ownership) may be tracked on a decentralized ledger. Execution of the battle within the game space includes recording battle information characterizing the battle. The players participating in the battle may transfer the non-fungible tokens they own, and thus the corresponding game units, to a contract wallet administered by a smart contract. Result information, including a winning player and a losing player, may be determined based on the battle information. Statistical information stored in correspondence with the game units may be updated based on the result information. The smart contract may cause, based on the battle information, a transfer of a set of non-fungible tokens corresponding to a set of the game units involved in the battle from the contract wallet to a player wallet of the winning player. Thus, the losing player may lose some game units and the winning player may gain some game units. As such, the system may facilitate and manage transfers of the digital assets (e.g., non-fungible tokens) amongst players based on battles between the game units.

The system may include one or more hardware processors configured by machine-readable instructions, electronic storage, decentralized ledger server(s), and/or other components. The machine-readable instructions may include one or more instruction components. The instruction components may include computer program components. The instruction components may include one or more of game component, transfer component, game unit update component, and/or other instruction components.

The game component may be configured to execute an instance of a game space, and facilitate presentation of views of the game space to players to enable interaction of the players with the game space and/or each other by performing operations in the game space in response to commands received from the players through client computing platforms associated with the players. The game space may include a battle involving game units and/or other elements. The execution of the battle may include recording battle information characterizing the battle and/or other activities. The game units may correspond to non-fungible tokens that are stored in player wallets associated with the players in the battle.

The transfer component may be configured to effectuate transfer of particular ones of the non-fungible tokens from the player wallets to a contract wallet administered by a smart contract. The particular non-fungible tokens may correspond to particular ones of the game units to be involved in the battle.

The game unit update component may be configured to determine, based on the battle information and/or other information, result information for the game units involved in the battle. The battle information may indicate a winning player and a losing player of the players in the battle, and/or other battle information. The game unit update component may be configured to effectuate, based on the result information, the game unit identifiers, and/or other information, updates to the statistical information for the individual game units involved in the battle.

Subsequently, the transfer component may be configured to transmit the battle information to the smart contract such that the smart contract effectuates, based on the battle information, a transfer of a first set of the non-fungible tokens involved in the battle from the contract wallet to a first player wallet associated with the winning player, wherein the first set of the non-fungible tokens were initially transferred to the contract wallet from a second player wallet associated with the losing player prior to the battle.

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

FIG. 5 illustrates a method to facilitate game unit management with a smart contract that manages statistical information and ownership of game units responsive to battles involving the game units, in accordance with one or more implementations.

DETAILED DESCRIPTION

Figure 1:
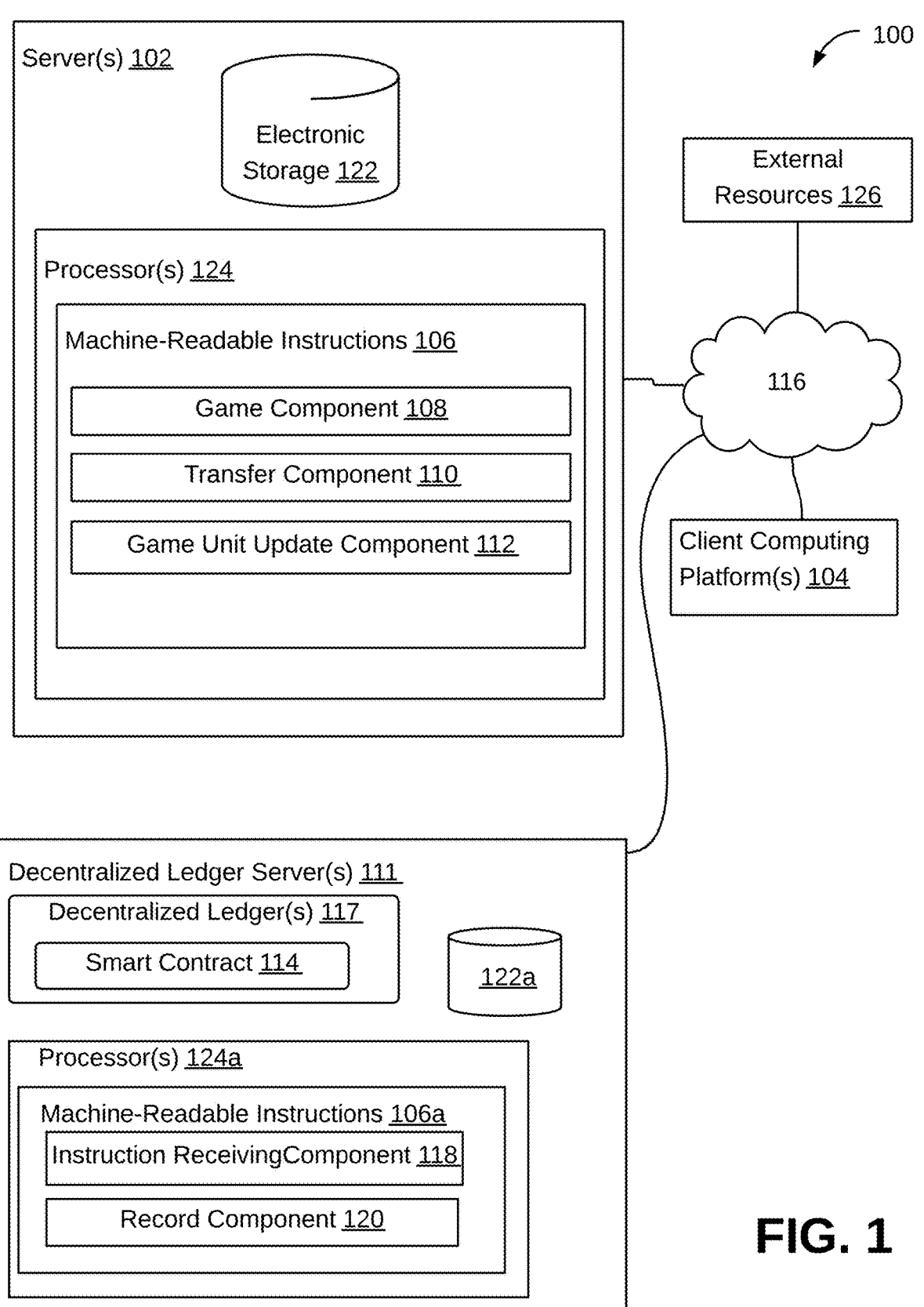
FIG. 1 illustrates a system configured to facilitate game unit management with a smart contract that manages statistical information and ownership of game units responsive to battles involving the game units, in accordance with one or more implementations.

FIG. 1 illustrates a system 100 configured to facilitate game unit management with a smart contract 114 that manages statistical information and ownership of game units responsive to battles involving the game units, in accordance with one or more implementations. In some implementations, system 100 may include one or more server(s) 102, one or more decentralized ledger server(s) 111 used to implement one or more decentralized ledger(s) 117, and/or other components. The game units may be correlated with digital assets.

As used herein, the term "digital asset" may refer to a serial code tracked on decentralized ledger(s) 117. The digital assets may be uniquely identified and/or uniquely identifiable. As used herein, rights pertaining to digital assets may be tracked, recorded, and/or otherwise registered on one or more permanent registries. As such, an individual digital asset may be a registry-tracked digital asset.

Individual digital assets may be correlated with another entity (which may be referred to as a "correlated entity") by virtue of technology provided and/or supported by the one or more permanent registries on which the rights pertaining to the individual digital assets is tracked (including but not limited to smart contracts and/or other executable code on the one or more permanent registries). Accordingly, rights pertaining to a digital asset may correlate to the provision of one or more rights (e.g., accessibility) with respect to the correlated entity (e.g., control and/or other accessibility). Transactions involving a digital asset recorded on a decentralized ledger may correlate to certain transactions (or modifications) of the correlated entity, and/or vice versa.

Various types and/or combinations of correlated entities are envisioned within the scope of this disclosure, including but not limited to physical and/or virtual objects, content, items, rights, memberships, grants, etc. The use of the singular "entity" or "correlated entity" is not intended to be limiting, as multiple different objects, content, items, rights, memberships, grants, etc. may be correlated to a single digital asset. By way of non-limiting example, a correlated entity may be a physical item (e.g., artwork, a ticket to an event), a subscription to certain media content, content, a virtual item (e.g., game units), and so forth. The content may include an image, a video, a graphic image file, a signature of notoriety, a sound bite of an audio file, the audio file, and/or other content. In some implementations, the correlated entity may refer to any item or object related to art and entertainment for which a user may use, own, sell, trade, loan, destroy, and/or otherwise effectuate a change of ownership, access, or control (including exchanges through challenges).

A digital asset may be fungible if it is functionally and/or physically indistinguishable from another digital asset. A digital asset may be non-fungible if it is unique, or one-of-a-kind. For example, a specific individual may be non-fungible. A digital asset may be semi-fungible if there is a set of a limited number of similar but distinguishable digital assets. For example, a limited amount of images of sports team for a particular year may be semi-fungible. For example, a digital ticket to a show, concert, exhibition, and/or other event may be semi-fungible. The semi-fungible digital assets are considered as unique, "not fungible", or non-fungible digital assets. In some implementations, the digital assets may include non-fungible tokens, fungible tokens, semi-fungible tokens, and/or other digital assets.

Decentralized ledger server(s) 111 may include one or more of electronic storage 122a, processor(s) 124a, machine-readable instructions 106a, decentralized ledger(s) 117, and/or other components. Electronic storage 122a may be similar to electronic storage 122 as described elsewhere in this disclosure, though included in decentralized ledger server(s) 111 as depicted in FIG. 1. Machine-readable instructions 106a may include one or more instruction components. The instruction components may include computer program components. The instruction components may include one or more of an instruction receiving component 118, a record component 120, and/or other instruction components. Processor(s) 124a may be similar to processor(s) 124 as described elsewhere in this disclosure, though included in decentralized ledger server(s) 111, as depicted in FIG. 1. Machine-readable instructions 106a may be similar to machine-readable instructions 106 as described elsewhere in this disclosure, though included in decentralized ledger server(s) 111, as depicted in FIG. 1.

Decentralized ledger server(s) 111 may be used to implement one or more decentralized ledger(s) 117. In some implementations, decentralized ledger(s) 117 may be maintained by distributed computing platforms (not shown in FIG. 1). In some implementations, a distributed computing platform may be implemented by a set of client computing platforms and/or servers (including, for example, one or more decentralized ledger server(s) 111). The distributed computing platform may support a virtual machine (not shown in FIG. 1). The distributed computing platform and/or the virtual machine may form a runtime environment for smart contracts and/or other executable code. A distributed computing platform may include electronic storage configured to store part or all of decentralized ledger(s) 117. The smart contracts (e.g., smart contract 114) may be stored on decentralized ledger(s) 117 and/or another decentralized ledger. In some implementations, the distributed computing platform may be the EOSIO platform. In some implementations, the distributed computing platform may be similar to or based on the EOSIO platform. In some implementations, the distributed computing platform may be Ethereum. In some implementations, the distributed computing platform may be similar to or based on Ethereum. In some implementations, the virtual machine may be a decentralized virtual machine.

In some implementations, at least one of the decentralized ledger(s) 117 implemented by decentralized ledger server(s) 111 is a private permissioned decentralized ledger. The private permissioned decentralized ledger may be configured to record information and/or track addresses (e.g., corresponding to digital wallets, smart contracts, etc.). The recorded information may pertain to one or more digital assets recorded on decentralized ledger(s) 117. The recorded information may include ownership of the digital assets and/or other assets. For example, ownership rights and/or other rights may be modified. In some implementations, the ownership rights and/or other rights may be indicated by addresses tracked by decentralized ledger(s) 117 that correspond to digital wallets of users.

Decentralized ledger(s) 117 may record rights pertaining to assets. For example, a blockchain is a type of ledger, as well as a type of decentralized database that records rights pertaining to digital assets. The assets may include digital asset and/or physical assets. A given (digital) asset may be owned by a particular player. An asset may include anything of material value or usefulness that is owned by or on behalf of one or more players. In some implementations, a virtual item, such as a game unit described herein, may be represented by a digital asset that is recorded on decentralized ledger(s) 117. In some implementations, a right pertaining to an object (e.g., a distribution right) may be an asset, the object being a physical or a virtual asset. Multiple rights may form a set of rights or a bundle of rights that may be transferred and/or otherwise acted on and/or operated on together. For example, rights may include one or more of a right to use, a right to sell, a right to destroy, a right to certain types of distributions, and/or other rights. For example, in some implementations, rights pertaining to a virtual asset (e.g., ownership) may be recorded on decentralized ledger(s) 117. In some implementations, tokens may be a type of asset. In some implementations, the tokens may include one or more of non-fungible tokens, security tokens, utility tokens, payment tokens, initial coin offering (ICO) tokens, virtual currency tokens, crypto tokens, ERC-20 tokens, EOS tokens, and/or other tokens. In some implementations, tokens not only represent value, but may have a specific use in a particular distributed computing platform, e.g., in the operation of decentralized ledger(s) 117.

In some implementations, digital assets may be removed from one decentralized ledger and added or recorded on another decentralized ledger. In some implementations, at least one of the decentralized ledger(s) 117 implemented by decentralized ledger server(s) 111 is a public decentralized ledger. The public decentralized ledger may be configured to be part of either EOSIO mainnet, Ethereum mainnet, Ethereum 1.5, Ethereum 2.0, a derivative of Ethereum 2.0 that is configured to perform transactions of Ether (ETH) between accounts, or a derivative of EOSIO that is configured to perform transactions of EOS between different accounts.

In some implementations, decentralized ledger(s) 117 may register transactions that modify ownership (and/or other rights) pertaining to digital assets. A smart contract (e.g., smart contract 114) may implement a (type of) digital asset. For example, a smart contract may implement at least a part of a participative-support exchange. In some implementations, once a smart contract has been added to a blockchain, the smart contract may be referred to as published, posted, registered, and/or recorded.

Elements of decentralized ledger(s) 117 may be grouped together in units that are referred to as blocks. For example, an individual block may include one or more assets (e.g., non-fungible tokens) and/or one or more transactions. For example, an individual block may be linked to one or more other individual blocks. Individual blocks may be linked or chained together to form a structure of blocks and/or a hierarchy of blocks, such as, e.g., a chain of blocks. An individual block may include one or more assets (e.g., non-fungible tokens), one or more transactions, and/or other information.

In some implementations, an individual decentralized ledger server(s) 111 may be dedicated to a particular node of a decentralized ledger(s) 117. Typically, different nodes are included in (or implemented by, or hosted by) different servers or different computer systems to increase the safety and security of transactions on a decentralized ledger and/or blockchain. The consensus protocol used for a particular blockchain will be harder to falsify or circumvent when the different nodes are in different geographical locations, on different types of computing platforms, and/or are otherwise distributed and diverse.

In some implementations, one or more decentralized ledger(s) 117 implemented by decentralized ledger server(s) 111 may be publicly accessible. In some implementations, one or more decentralized ledger(s) 117 implemented by decentralized ledger server(s) 111 may be private and/or permissioned. In some implementations, one or more decentralized ledger(s) 117 implemented by decentralized ledger server(s) 111 may be append-only. In some implementations, existing blocks and/or nodes of one or more decentralized ledger(s) 117 implemented by decentralized ledger server(s) 111 can substantially not be altered or deleted, unless multiple copies are altered. This is unlikely to happen provided that the multiple copies stored on different computing platforms, e.g., in different geographical locations, are in accordance with the relevant consensus protocol(s). Decentralized ledger(s) 117 may be replicated on multiple computing platforms, preferably in multiple different geographical locations. Additionally, individual blocks and/or nodes may be linked together in a manner that prevents tampering, such as, e.g., using a hash chain and/or digital signatures. In particular, hash values may be generated using fixed-output-length one-way hashing functions that take variable-length input, and may be effectively impossible (or, at least, computationally infeasible) to reverse. As such, a hashing function may provide one-way encryption. By way of non-limiting example, the hashing function may be SHA-256, BLAKE2, SHAKE256, and/or another hashing function. Contents of individual blocks, individual nodes, transactions, and/or assets may be digitally signed in a manner that proves integrity and/or prevents tampering, e.g., by providing authentication, as well as repudiation.

Server(s) 102 may include electronic storage 122, processor(s) 124, machine-readable instructions 106, and/or other components. In some implementations, server(s) 102 may be configured to communicate with one or more client computing platform(s) 104 according to a client/server architecture and/or other architectures. Client computing platform(s) 104 may be configured to communicate with other client computing platforms 104 via server(s) 102 and/or according to a peer-to-peer architecture and/or other architectures. In some implementations, players may access system 100 via client computing platform(s) 104. In some implementations, decentralized ledger server(s) 111 may be configured to communicate with one or more of server(s) 102, client computing platform(s) 104, and/or other entities and/or components, e.g., through one or more network(s) 116.

Server(s) 102 may be configured by machine-readable instructions 106. Machine-readable instructions 106 may include one or more instruction components. The instruction components may include computer program components. The instruction components may include one or more of game component 108, transfer component 110, game unit update component 112, and/or other instruction components.

Game component 108 may be configured to execute an instance of a game space and facilitate presentation of views of the game space to players to enable interaction of the players with the game space and/or each other. The interactions may be enabled by performing operations in the game space in response to commands received from the players through client computing platforms 104 associated with the players. The operations may be in-game implementations implemented by game component 108. The game space may include and facilitate battles involving game units. As used herein, the term "battle" may refer to a game, match, or competition between the players by way of playing the game units against each other. A game unit may refer to, for example, a digital playing card that may participate in the battles with digital playing cards, fantasy sports playing cards, and/or other playing elements. In some implementations, the game unit may be a character, an animal, a pet, and/or other game unit. In some implementations, the digital playing card as the game unit may represent a character, a weapon, an animal, a pet, a skill or effect, a trap, and/or other in-game elements. The fantasy sports playing cards may be a sports player, e.g., baseball player, football player. As used herein, "game unit" may refer to a digital playing card, although is not intended to be limiting as other implementations are contemplated.

The game units may correspond to digital assets that are stored in (digital) player wallets associated with the players in the battle. The player wallets may correspond to addresses on decentralized ledger(s) 117. The player wallets may indicate the digital assets, and thus the game units, owned by the players. The player wallet may further indicate ownership of one or more other assets. For example, the assets may include the digital assets (e.g., the non-fungible tokens) and physical assets (e.g., real estate, art).

An asset may be or include a digital representation of persons, fictional characters, locations, objects, and identifiers such as brands and logos, for example, which populate a virtual reality (VR), augmented reality (AR), or mixed reality (MR) environment. Such digital representations may depict individual game spaces that can be experienced by any number of users synchronously and persistently, while providing continuity of data such as personal identity, user history, entitlements, possessions, payments, and the like. Moreover, in some implementations, an asset may be a hybrid of traditional audio-video and fully immersive VR/AR/MR experiences, such as interactive video.

The instance of the game space may include a simulated/virtual space that is accessible by the players by clients (e.g., client computing platforms 104) that present the views of the virtual space to a player. The simulated space may have a topography, express ongoing real-time interaction by one or more of the players, and/or include one or more objects positioned within the topography that are capable of locomotion and/or movement within the topography. In some implementations, the topography may be a 2-dimensional topography. In some implementations, the topography may be a 3-dimensional topography. The topography may include dimensions of the simulated space, and/or surface features of a surface or objects that are native to the simulated space. In some implementations, the topography may include a surface (e.g., a ground surface) that runs through at least a substantial section of the simulated space. In some implementations, the topography may describe a volume with one or more bodies positioned therein. The instance executed by the computer components may be synchronous, asynchronous, and/or semi-synchronous.

Within the instance of the game space, the players may control characters, control objects, control simulated physical phenomena, play game units in battles, and/or other actions with elements within the virtual space to interact with the virtual space and/or each other. The characters may include avatars. As used herein, the term "character" may refer to an object or group of objects present in the virtual space, that correspond(s) to an individual player. A particular player character may be controlled by the particular player with which it is associated. Such characters may be referred to as player-controlled characters. Player-controlled element(s) may move through and interact with the virtual space (e.g., non-player characters in the virtual space, other objects in the virtual space, etc.). The game units may be player-controlled elements. A particular game unit may be played by the particular player with which it is associated and owned by. In some implementations, player-controlled characters may be capable of locomotion and/or movement within the topography of the simulated space that is included in the instance of a game. For example, a given game unit may correspond to a movement by the player-controlled characters (e.g., a dance move) such that the movement may be performed by the player-controlled character upon a given player playing the given game unit in a battle. Player-controlled elements controlled by and/or associated with a given player may be created and/or customized by the given player. For example, the dance move may be customized by the given player.

Executing the battle may include recording battle information characterizing the battle. The battle information may include the players involved in the battle, actions taken by the individual players, wins, losses, one or more winning players of the players involved, one or more losing players of the players involved, and/or other battle information. The actions taken by the individual players may include battling specific ones of their game units that correspond to the digital assets transferred from their player wallets to a contract wallet, skipping a turn, forfeiting, causing a particular play (e.g., first attack, final attack, attack that weakened other game unit), and/or other actions. The actions taken by the players may be received by game component 108 as the commands. The wins and losses may be for the individual battles and/or for individual rounds within the battles. The one or more winning players may be the player(s) that won the battle. The one or more losing players may be the player(s) that lost the battle.

In some implementations, the battle information may convey which one of the players involved in the battle performed the last action (e.g., battling specific ones of their game units) against another one of the players (e.g., the losing player). Based on the last action performed, the player that effectuated the last action may be determined as the winning player.

Transfer component 110 may be configured to effectuate transfer of particular ones of the digital assets from the player wallets to the contract wallet administered by smart contract 114. In some implementations, the transfer may be effectuated responsive to transfer component 110 receiving an indication of manually selected game units that correspond with the particular digital assets. The indication may be from client computing platforms 104 associated with the players. The particular digital assets may correspond to particular ones of the game units to be involved in the battle. In some implementations, the players may indicate one or more additional digital assets that correspond to game units they own but not game units to be involved in the battle. Such additional digital assets may be at stake to win or lose by way of results of the battles. For example, the additional digital assets may include a limited-edition game unit or other high value game unit that the players own, but may not be intend to be played in the battle.

Smart contract 114 may be recorded to decentralized ledger(s) 117. Smart contract 114 may be configured to effectuate transfers of digital assets included in the contract wallet based on an outcome of the battle as conveyed by the battle information. Smart contract 114 may be configured by an administrative user of system 100 (e.g., internal software developer) or may be pre-configured by a user external to system 100. In some implementations, the transfer may be effectuated upon the players indicating the game units via the game space, and thus the corresponding digital assets, to risk, or to risk and participate in the battle. In some implementations, upon the contract wallet receiving the digital assets, smart contract 114 may receive the addresses on decentralized ledger(s) 117 that correspond to the players wallets that the digital assets are being transferred from. Such indication of the game units may be received by transfer component 110. As such, the digital assets that correspond to the game units participating in the battle may thus indicate which of the players are involved in the battle and included in the battle information.

Electronic storage 122 may be configured to store statistical information for the individual game units. The individual statistical information may be identified by a game unit identifier that is associated with the individual game units and the corresponding digital assets. The game unit identifiers may be unique to the game unit and its corresponding digital asset. The game unit identifier may include a numeric code, an alphabetical code, an alphanumeric code, and/or other unique identifier. The statistical information may characterize how a given game unit performs in the battle against other game units. The statistical information may include values to parameters. By way of non-limiting example, the parameters for a game unit that represents a character may include at least health, attack power, brutality, stamina, cohesion, speed, armor, resistance, quickness, and/ or other parameters. By way of non-limiting example, the parameters for a game unit that represents a weapon may include at least infliction, damage, critical chance, critical power, brutality, and/or other parameters. By way of non-limiting example, the parameters for a game unit that represents a resource may include at least yield, effectiveness, multiplication, production, and/or other parameters. By way of non-limiting example, the parameters for a game unit that represents a sports player may include a batting average, runs, throwing accuracy, throwing precision, running speed, touchdowns, and/or other parameters. The values to the parameters may be updated with nerfs and buffs based on results of battles. That is, the buffs increase the values and the nerfs decrease the values.

Game unit update component 112 may be configured to determine result information for the game units involved in the battle and/or other information. The result information may include the nerfs and the buffs to the values of the parameters that comprise the statistical information. The result information may be determined based on the battle information. That is, based on the wins and the losses of the rounds, the actions, the winning player(s), the losing player(s), and/or the other battle information, effects to the statistical information may be determined. In some implementations, the nerfs and the buffs for the statistical information may be the same for all game units. In some implementations, the nerfs and the buffs for the statistical information may be different based on what the game unit represents (e.g., a character, a weapon, an animal, baseball player, etc.). In some implementations, the nerfs and the buffs for the statistical information may be based on the specific ones of the game units battled by each of the players. In some implementations, the nerfs and the buffs may differ for each of the parameters.

Game unit update component 112 may be configured to effectuate updates to the statistical information for the individual game units involved in the battle. The updates to the statistical information may be based on the result information and the game unit identifiers. Effectuating the updates may update the values to the parameters that comprise the statistical information in accordance with the result information. The game unit identifiers may facilitate identifying the statistical information in electronic storage 122 to update. As such, the corresponding digital assets may be associated with the statistical information that reflects performance in the battles that the corresponding game units are played in.

Transfer component 110 may be configured to transmit the battle information to smart contract 114. As such, smart contract 114 may effectuate, based on the battle information, a transfer of a first set of the digital assets from the contract wallet to a first player wallet associated with the winning player. Smart contract 114 may be configured to execute such transfer. The first set of digital assets may be considered involved in the battle or at least risked via the battle upon the first set being included in the contract wallet. The first set may include one or more digital assets. The first set of the digital assets may have been initially transferred to the contract wallet from a second player wallet associated with the losing player prior to the battle. In some implementations, the first set of the digital assets may have been initially transferred to the contract wallet from the second player wallet and other player wallets associated with other losing players given that more than two players battled their game units in the battle. Some or all of the first set of digital assets received by the first player wallet may be associated with the updated statistical information for the corresponding game units. Thus, the winning player may own or hold the game units with its statistical information updated from the battle by way of the corresponding first set of the digital assets being transferred from the contract wallet to the first player wallet.

In some implementations, the battle information may indicate more than one winning player. Upon more than one winning player of the battle, smart contract 114 may be configured to randomly select subsets of the digital assets from the first set and transfer the subsets to randomly selected ones of the winning players. In some implementations, the subsets may include an equal amount of the digital assets so that all the winning players receive the same amount of the digital assets and thus the corresponding game units to play in subsequent battles. In some implementations, the subsets may include at least one of the digital assets from the first set. Subsequently, transfer component 110 may be configured to select one of the subsets at random and include the remaining digital assets from the first set. In some implementations, transfer component 110 may be configured to determine which of the digital assets correspond with the game units associated with the best statistical information. At least one of the digital assets determined may be included in each the subsets and the remainder of the digital assets from the first set may be evenly distributed to the subsets. Smart contract 114 may be configured to subsequently transmit the subsets to the player wallets of the winning players.

In some implementations, transferring the digital assets from the contract wallet to the player wallets associated with the winning player(s) may include smart contract 114 generating sets of instructions for decentralized ledger server(s) 111 so that the ownership rights for those digital assets are recorded in decentralized ledger(s) 117 as held by the appropriate winning player(s) instead of the appropriate losing player(s). In some implementations, smart contract 114 may be configured to transfer the generated sets of instructions to decentralized ledger server(s) 111. In some implementations, these instructions may instruct decentralized ledger server(s) 111 to record, add, remove, and/or modify rights on one or more ledgers. In some implementations, these instructions may instruct decentralized ledger server(s) 111 to record, add, remove, and/or modify the ownership rights and/or other rights pertaining to the game units and thus the digital assets in decentralized ledger(s) 117. As a result, for example, decentralized ledger(s) 117 may reflect that the address associated with the first player wallet (of the winning player) includes the ownership rights to the first set of digital assets, and the address associated with the second player does not.

Instruction receiving component 118 may be configured to receive (sets of) instructions to add, modify, analyze, and/or remove recorded information (e.g., rights) in decentralized ledger(s) 117. For example, instruction receiving component 118 may receive one or more sets of instructions from transfer component 110 and/or other components of system 100. Instruction receiving component 118 may provide received sets of instructions to record component 120 for execution. In some implementations, instruction receiving component 118 may be arranged, organized, and/or otherwise included in decentralized ledger server(s) 111 and/or decentralized ledger(s) 117.

Record component 120 may be configured to record information, including but not limited to ownership rights pertaining to the digital assets associated with game units, e.g., on one or more permanent ledgers such as decentralized ledger(s) 117. In some implementations, record component 120 may add, modify, analyze, and/or remove recorded information. For example, in accordance with received instructions from instruction receiving component 118, record component 120 may transfer ownership rights pertaining to a particular digital asset from the second player to the first player (e.g., from an original owner to a new owner, or from the losing player of the battle to the winning player of the battle) such that the recorded information on decentralized ledger(s) 117 no longer reflect the rights pertaining to the particular digital asset by the second player.

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

In some implementations, server(s) 102, client computing platform(s) 104, and/or external resources 126 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 126 may be operatively linked via some other communication media.

A given client computing platform 104 may include one or more processors configured to execute computer program components. The computer program components may be configured to enable an expert or player associated with the given client computing platform 104 to interface with system 100 and/or external resources 126, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 126 may include sources of information outside of system 100, external entities participating with system 100, and/or other resources. In some implementations, some or all of the functionality attributed herein to external resources 126 may be provided by resources included in system 100.

Server(s) 102 may include electronic storage 122, one or more processors 124, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 122 may comprise non-transitory storage media that electronically stores information. The electronic storage media of electronic storage 122 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 122 may include one or more virtual storage resources (e.g., cloud storage, a virtual private network, and/or other virtual storage resources). Electronic storage 122 may store software algorithms, information determined by processor(s) 124, information received from server(s) 102, information received from client computing platform(s) 104, and/or other information that enables server(s) 102 to function as described herein.

Processor(s) 124 may be configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. Processor(s) 124 may be configured to execute components 108, 110, 112, 118, and/or 120, and/or other components. Processor(s) 124 may be configured to execute components 108, 110, 112, 118, and/or 120, and/or other components by software; hardware; firmware; some combination of software, hardware, and/or firmware; and/or other mechanisms for configuring processing capabilities on processor(s) 124. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 118, and/or 120 are illustrated in FIG. 1 as being implemented within a single processing unit, in implementations in which processor(s) 124 includes multiple processing units, one or more of components 108, 110, 112, 118, and/or 120 may be implemented remotely from the other components. The description of the functionality provided by the different components 108, 110, 112, 118, and/or 120 described below is for illustrative purposes, and is not intended to be limiting, as any of components 108, 110, 112, 118, and/or 120 may provide more or less functionality than is described. For example, one or more of components 108, 110, 112, 118, and/or 120 may be eliminated, and some or all of its functionality may be provided by other ones of components 108, 110, 112, 118, and/or 120. As another example, processor(s) 124 may be configured to execute one or more additional components that may perform some or all of the functionality attributed below to one of components 108, 110, 112, 118, and/or 120.

Figure 3:
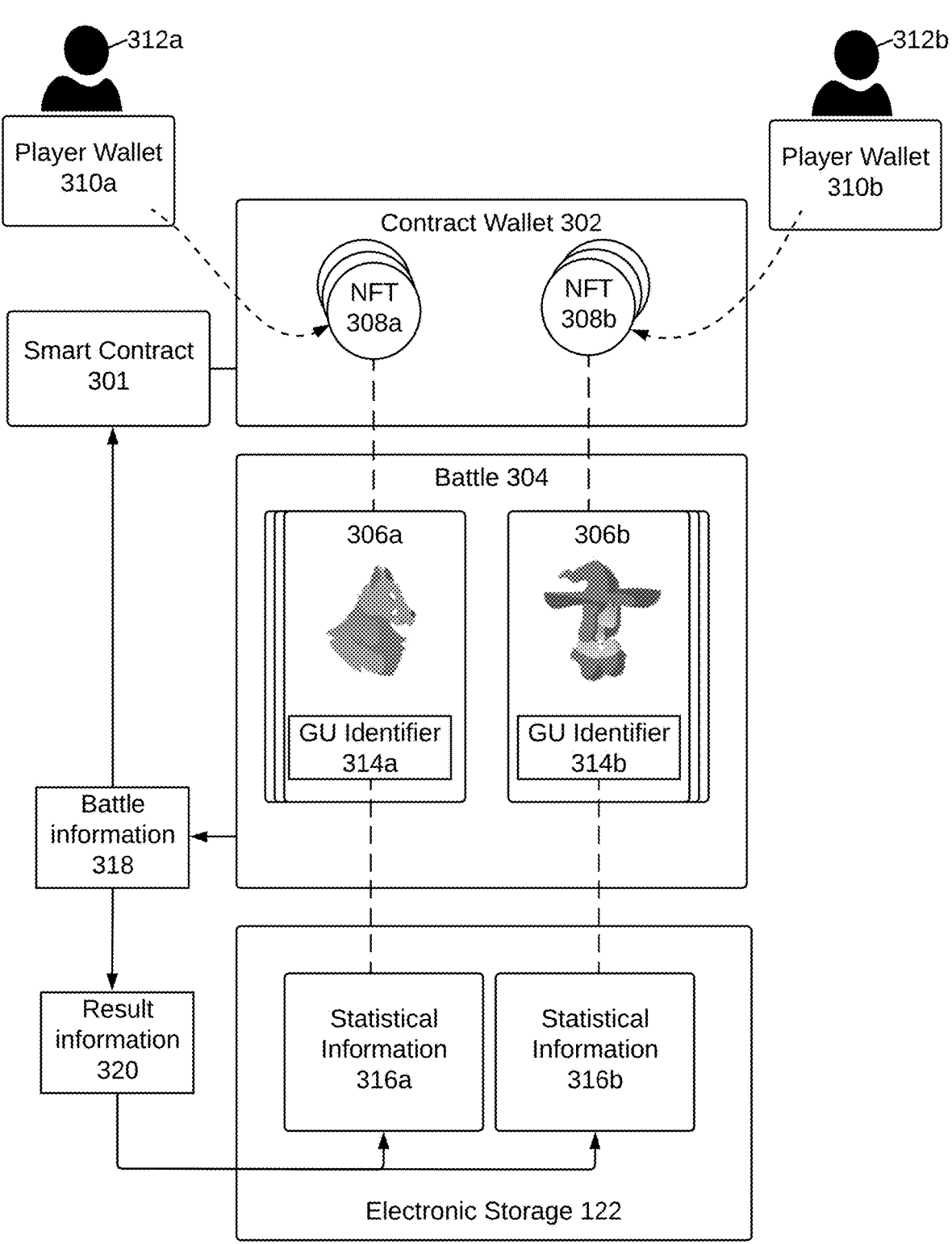
FIG. 3 illustrates an example implementation of the system configured to facilitate game unit management with a smart contract that manages statistical information and ownership of game units responsive to a battle involving the game units, in accordance with one or more implementations.

FIG. 3 illustrates the system configured to facilitate game unit management with a smart contract that manages statistical information and ownership of game units responsive to battles involving the game units, in accordance with one or more implementations. FIG. 3 illustrates a contract wallet 302 administered by a smart contract 301 that effectuates transfer of non-fungible tokens to players based on battle information of a battle 304 between game units that correspond to the non-fungible tokens. The game units involved in battle 304 may include at least game unit 306a and game unit 306b. Player wallets 310a and 310b may be associated with a player 312a and 312b, respectively. Given that battle 304 involves game unit 306a and game unit 306b, non-fungible token (NFT) 308a corresponding to game unit 306a may be transferred from player wallet 310a to contract wallet 302 and NFT 308b corresponding to game unit 306b may be transferred from player wallet 310b to contract wallet 302. Additional game units may be involved in battle 304 and thus additional corresponding non-fungible tokens may be transferred from player wallets 310a and 310b to contract wallet 302, appropriately. Game units 306a and 306b may be associated with game unit (GU) identifiers 314a and 314b, respectively, that identify statistical information 316a and 316b, respectively, stored in electronic storage 122 (the same as in FIG. 1). Battle information 318 that characterizes battle 304 may be generated upon execution of battle 304. Battle information 318 may facilitate determination of result information 320. Subsequently, result information 320 may affect updates upon statistical information 316a and 316b by way of nerfs and buffs. Battle information 318 may be transmitted to smart contract 301 so that smart contract 301 may effectuate transfers of at least one of the non-fungible tokens transferred to contract wallet 302 by a losing player to a winning player indicated by battle information 318. For example, player 312b may be the winning player, so NFT 308a (and in some implementations, other NFTs transferred from player wallet 310a) may be transferred to player wallet 310b.

Figure 4:
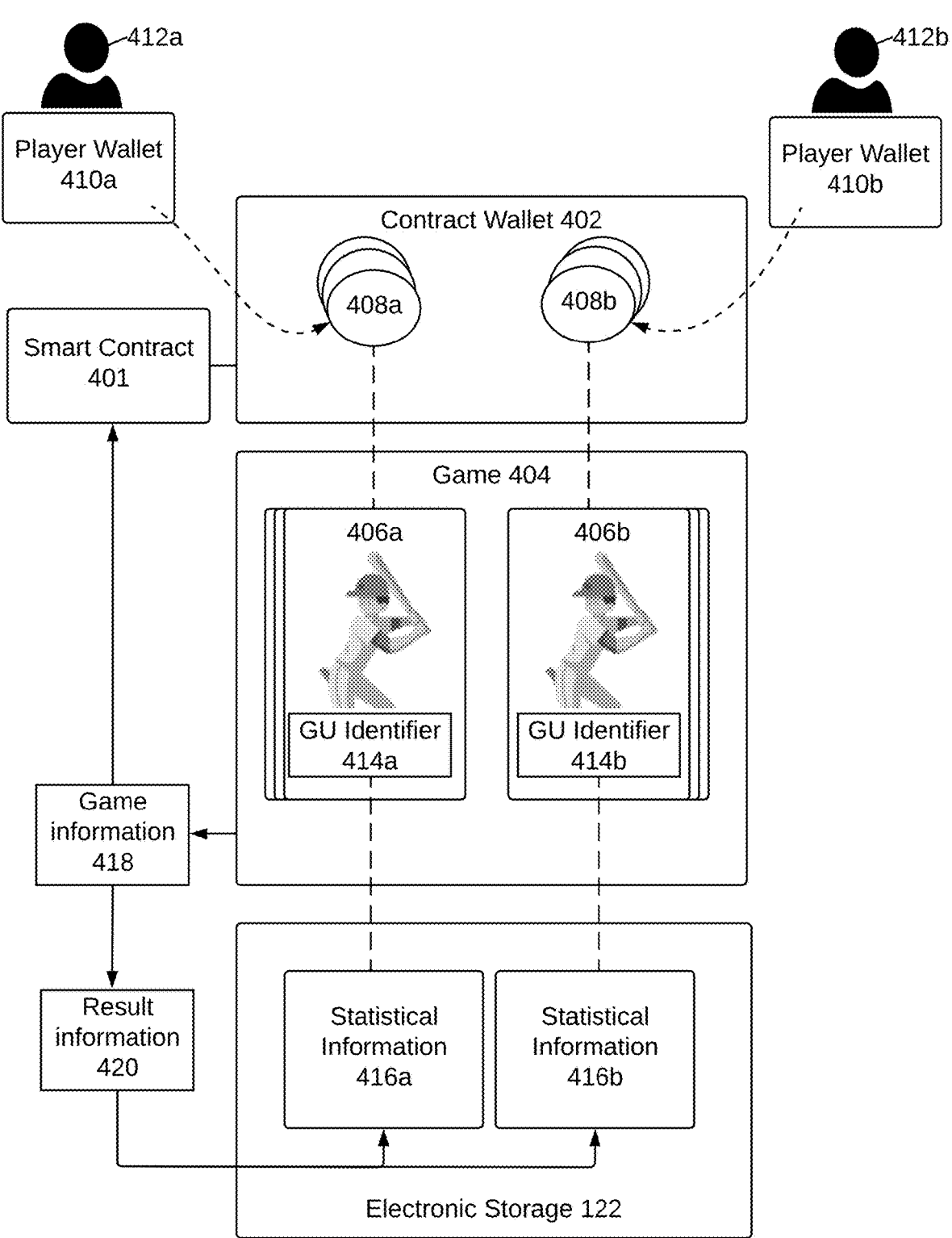
FIG. 4 illustrates an example implementation of the system configured to facilitate game unit management with a smart contract that manages statistical information and ownership of game units responsive to a game involving the game units, in accordance with one or more implementations.

FIG. 4 illustrates the system configured to facilitate game unit management with a smart contract that manages statistical information and ownership of game units responsive to sporting games involving the game units, in accordance with one or more implementations. FIG. 4 illustrates a contract wallet 402 administered by a smart contract 401 that effectuates transfer of digital assets to players based on game information of a game 404 between game units that correspond to the digital assets. The game units involved in game 404 may include at least game unit 406a and game unit 406b. Player wallets 410a and 410b may be associated with a player 412a and 412b, respectively. Given that game 404 involves game unit 406a and game unit 406b, digital asset 408a corresponding to game unit 406a may be transferred from player wallet 410a to contract wallet 402 and digital asset 408b corresponding to game unit 406b may be transferred from player wallet 410b to contract wallet 402. Additional game units may be involved in game 404 and thus additional corresponding digital assets may be transferred from player wallets 410a and 410b to contract wallet 402, appropriately. Game units 406a and 406b may be associated with GU identifiers 414a and 414b, respectively, that identify statistical information 416a and 416b, respectively, stored in electronic storage 122 (the same as in FIG. 1). Game information 418 that characterizes game 404 may be generated upon execution of game 404. For example, game unit 406a may be played to bat and game unit 406b may be played to pitch given that game 404 is a baseball game. Game information 418 may facilitate determination of result information 420. Subsequently, result information 420 may affect updates upon statistical information 416a and 416b by way of nerfs and buffs. Game information 418 may be transmitted to smart contract 401 so that smart contract 401 may effectuate transfers of at least one of the digital assets transferred to contract wallet 402 by a losing player to a winning player indicated by game information 418. For example, player 412b may be the winning player or part of a winning team, so digital asset 408a (and in some implementations, other digital assets transferred from player wallet 410a) may be transferred to player wallet 410b.

Figure 2:
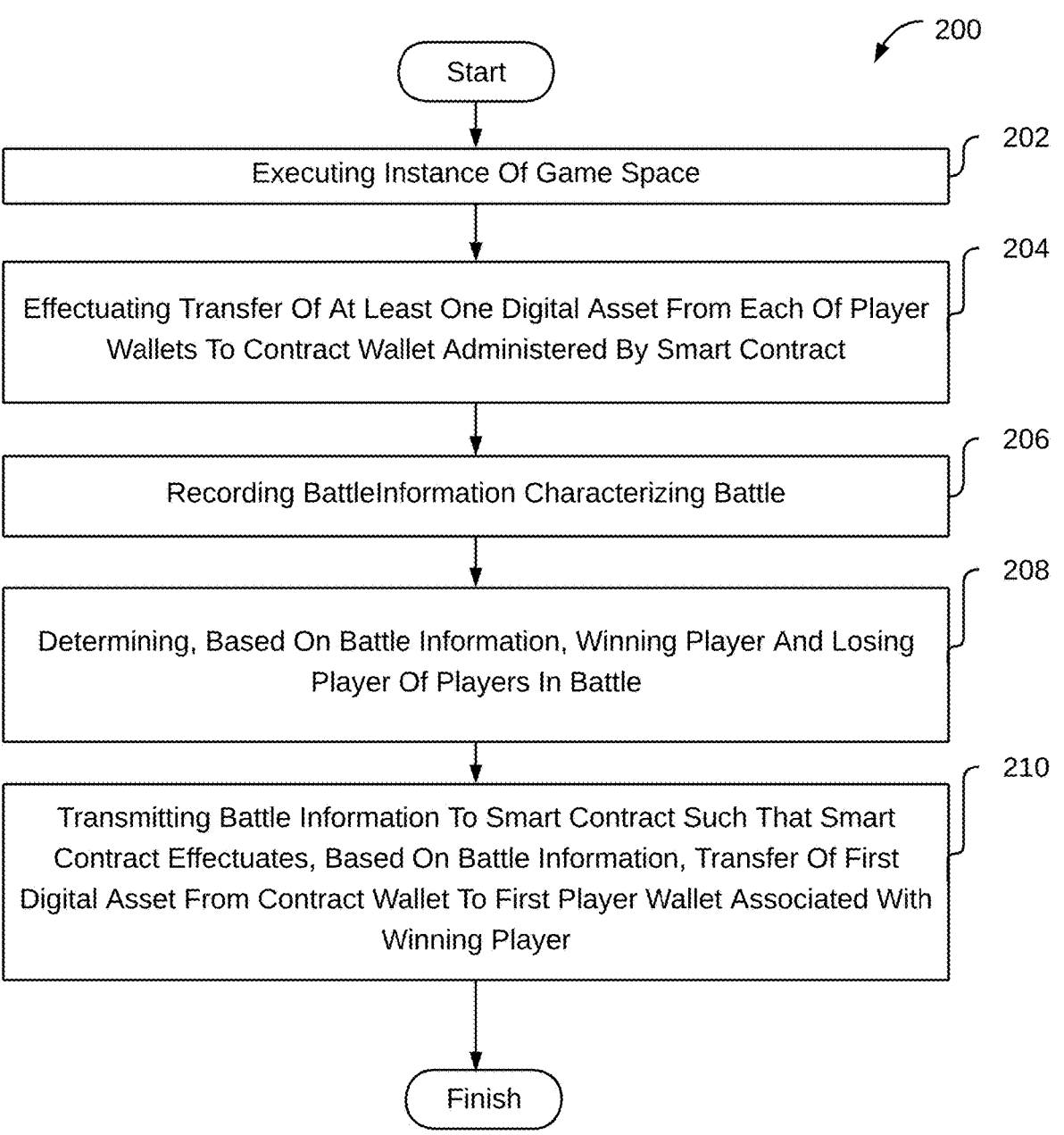
FIG. 2 illustrates a method to facilitate game unit management with a smart contract responsive to battles involving the game units, in accordance with one or more implementations.

FIG. 2 illustrates a method 200 to facilitate game unit management, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include executing an instance of a game space including a battle involving game units that correspond to digital assets stored in player wallets associated with players in the battle. Operation 202 may be performed by one or more hardware processors configured by machine-readable instructions including a component that is the same as or similar to game component 108, in accordance with one or more implementations.

An operation 204 may include effectuating transfer of at least one digital asset from each of the player wallets to a contract wallet administered by a smart contract. Operation 204 may be performed by one or more hardware processors configured by machine-readable instructions including a component that is the same as or similar to transfer component 110, in accordance with one or more implementations.

An operation 206 may include recording battle information characterizing the battle. Operation 206 may be performed by one or more hardware processors configured by machine-readable instructions including a component that is the same as or similar to game component 108, in accordance with one or more implementations.

An operation 208 may include determining, based on the battle information, a winning player and a losing player of the players in the battle. Operation 208 may be performed by one or more hardware processors configured by machine-readable instructions including a component that is the same as or similar to game unit update component 112, in accordance with one or more implementations.

An operation 210 may include transmitting the battle information to the smart contract such that the smart contract effectuates, based on the battle information, a transfer of a first digital asset from the contract wallet to a first player wallet associated with the winning player. Operation 210 may be performed by one or more hardware processors configured by machine-readable instructions including a component that is the same as or similar to transfer component 110, in accordance with one or more implementations.

FIG. 5 illustrates a method 500 to facilitate game unit management with a smart contract that manages statistical information and ownership of game units responsive to battles involving the game units, in accordance with one or more implementations. The operations of method 500 presented below are intended to be illustrative. In some implementations, method 500 may be accomplished with one or more additional operations not described, and/or without one or more of the operations discussed. Additionally, the order in which the operations of method 500 are illustrated in FIG. 5 and described below is not intended to be limiting.

In some implementations, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

An operation 502 may include executing an instance of a game space. The game space may include a battle involving game units. Executing the battle may include recording battle information characterizing the battle that involves the game units that correspond to non-fungible tokens initially stored in player wallets associated with the players in the battle. Operation 502 may be performed by one or more hardware processors configured by machine-readable instructions including a component that is the same as or similar to game component 108, in accordance with one or more implementations.

An operation 504 may include effectuating transfer of particular ones of the non-fungible tokens, that correspond to particular ones of the game units to be involved in the battle or not involved in the battle though at risk, from the player wallets to a contract wallet administered by a smart contract. Operation 504 may be performed by one or more hardware processors configured by machine-readable instructions including a component that is the same as or similar to transfer component 110, in accordance with one or more implementations.

An operation 506 may include determining result information, including a winning player and a losing player, for the game units involved in the battle based on the battle information. Operation 506 may be performed by one or more hardware processors configured by machine-readable instructions including a component that is the same as or similar to game unit update component 112, in accordance with one or more implementations.

An operation 508 may include effectuating, based on the result information and the game unit identifiers, updates to statistical information for the individual game units involved in the battle. Electronic storage may be configured to store the statistical information for the individual game units. The individual statistical information may be identified by a game unit identifier that is associated with the individual game units. Operation 508 may be performed by one or more hardware processors configured by machine-readable instructions including a component that is the same as or similar to game unit update component 112, in accordance with one or more implementations.

An operation 510 may include transmitting the battle information to the smart contract such that the smart contract effectuates, based on the battle information, a transfer of a first set of one or more of the non-fungible tokens involved in the battle from the contract wallet to a first player wallet associated with the winning player. The transfer may include generating a set of instructions to record a change in ownership rights for individual ones of the non-fungible tokens in the first set. Operation 510 may be performed by one or more hardware processors configured by machine-readable instructions including a component that is the same as or similar to transfer component 110, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to facilitate game unit management, the system comprising:
one or more processors configured by machine-readable instructions to:
execute an instance of a game space including a battle involving game units that correspond to digital assets recorded on a decentralized ledger in association with addresses, wherein the addresses are associated with player wallets of players participating in the battle, wherein a first player wallet of a first player corresponds to a first address, and a second player wallet of a second player corresponds to a second address;
for the players in the battle, cause transfers of the digital assets to a third address to be recorded on the decentralized ledger wherein the third address corresponds to a contract wallet administered by a smart contract, the transfers including:
a first transfer of a first digital asset from the first address to the third address; and
a second transfer of a second digital asset from the second address to the third address;
obtain battle information characterizing the battle;
determine, based on the battle information, a winning player and a losing player in the battle, including determining the first player is the winning player and the second player is the losing player; and
cause a third transfer of the first digital asset and the second digital asset from the third address to the first address to be recorded on the decentralized ledger by virtue of the first player being the winning player and in accordance with the smart contract.

2. The system of claim 1, further comprising electronic storage configured to store statistical information for the game units, wherein the statistical information for an individual game unit is identified by an individual game unit identifier that is associated with the individual game unit.

3. The system of claim 2, wherein the one or more processors are further configured by machine-readable instructions to:
determine, based on the battle information, result information; and
effectuate, based on the result information, updates to the statistical information for the game units involved in the battle.

4. The system of claim 2, wherein the one or more processors are further configured by machine-readable instructions to determine, based on the battle information, result information, wherein the result information includes nerfs and/or buffs to particular values of parameters included in the statistical information.

5. The system of claim 4, wherein the parameters include health, attack power, armor, infliction, resistance, quickness, critical chance, critical power, or a combination thereof.

6. The system of claim 1, wherein the battle information includes identifications of the players involved in the battle, descriptions of actions taken by the players, wins in the battle, losses in the battle, an identification of the winning player, an identification of the losing player, or a combination thereof.

7. The system of claim 1, wherein the one or more processors are further configured by machine-readable instructions to facilitate presentation of views of the game space to the players to enable interaction of the players with the game space and/or each other by performing operations in the game space in response to commands received from client computing platforms associated with the players.

8. The system of claim 7, wherein the commands received from the client computing platforms include battling specific ones of the game units.

9. The system of claim 1, wherein the smart contract is recorded on the decentralized ledger.

10. The system of claim 1, wherein the first digital asset corresponds to a first game unit involved in the battle, and the second digital asset corresponds to a second game unit involved in the battle.

11. A method to facilitate game unit management, the method comprising:
executing an instance of a game space including a battle involving game units that correspond to digital assets recorded on a decentralized ledger in association with addresses, wherein the addresses are associated with player wallets of players participating in the battle, wherein a first player wallet of a first player corresponds to a first address, and a second player wallet of a second player corresponds to a second address;
for the players in the battle, causing transfers of the digital assets to a third address to be recorded on the decentralized ledger, wherein the third address corresponds to a contract wallet administered by a smart contract, including:
causing a first transfer of a first digital asset from the first address to the third address to be recorded; and
causing a second transfer of a second digital asset from the second address to the third address to be recorded;
obtaining battle information characterizing the battle;
determining, based on the battle information, a winning player and a losing player in the battle, including determining the first player is the winning player and the second player is the losing player; and
causing a third transfer of the first digital asset and the second digital asset from the third address to the first address to be recorded on the decentralized ledger by virtue of the first player being the winning player and in accordance with the smart contract.

12. The method of claim 11, further comprising storing, in electronic storage, statistical information for the game units, wherein the statistical information for an individual game unit is identified by an individual game unit identifier that is associated with the individual game unit.

13. The method of claim 12, further comprising:
determining, based on the battle information, result information; and
effectuating, based on the result information, updates to the statistical information for the game units involved in the battle.

14. The method of claim 12, further comprising determining, based on the battle information, result information, wherein the result information includes nerfs and/or buffs to particular values of parameters included in the statistical information.

15. The method of claim 14, wherein the parameters include health, attack power, armor, infliction, resistance, quickness, critical chance, critical power, or a combination thereof.

16. The method of claim 11, wherein the battle information includes identifications of the players involved in the battle, descriptions of actions taken by the individual players, wins in the battle, losses in the battle, an identification of the winning player, an identification of the losing player, or a combination thereof.

17. The method of claim 11, further comprising facilitating presentation of views of the game space to the players to enable interaction of the players with the game space and/or each other by performing operations in the game space in response to commands received from client computing platforms associated with the players.

18. The method of claim 17, wherein the commands received from the client computing platforms include battling specific ones of the game units.

19. The method of claim 11, wherein the smart contract is recorded to the decentralized ledger.

* * * * *